(12) United States Patent
Froc

(10) Patent No.: US 12,556,286 B2
(45) Date of Patent: Feb. 17, 2026

(54) COHERENT OPTICAL RECEIVER

(71) Applicant: MITSUBISHI ELECTRIC CORPORATION, Tokyo (JP)

(72) Inventor: Gwillerm Froc, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 293 days.

(21) Appl. No.: 18/573,520

(22) PCT Filed: Dec. 17, 2021

(86) PCT No.: PCT/JP2021/048073
§ 371 (c)(1),
(2) Date: Dec. 22, 2023

(87) PCT Pub. No.: WO2023/281770
PCT Pub. Date: Jan. 12, 2023

(65) Prior Publication Data
US 2024/0297720 A1 Sep. 5, 2024

(30) Foreign Application Priority Data

Jul. 6, 2021 (EP) .................................... 21305933

(51) Int. Cl.
*H04B 10/00* (2013.01)
*H04B 10/61* (2013.01)
*H04J 14/00* (2006.01)

(52) U.S. Cl.
CPC ....... *H04B 10/612* (2013.01); *H04B 10/6151* (2013.01)

(58) Field of Classification Search
CPC ...... H04B 10/60; H04B 10/61; H04B 10/612; H04B 10/615; H04B 10/6151; H04B 10/616
See application file for complete search history.

(56) References Cited

U.S. PATENT DOCUMENTS

| 5,124,828 A | * | 6/1992 | Mahon | ............... H04B 10/6151 |
|---|---|---|---|---|
| | | | | 398/205 |
| 2022/0278766 A1 | * | 9/2022 | Zhou | .................... H04B 10/613 |
| 2024/0291572 A1 | * | 8/2024 | Moon | .................... H04B 10/64 |

FOREIGN PATENT DOCUMENTS

EP          3 886 342 A1     9/2021

OTHER PUBLICATIONS

3GPP, "3rd Generation Partnership Project; Technical Specification Group Radio Access Network; Study on New Radio Access Technology; Radio Interface Protocol Aspects (Release 14)", 3GPP TR 38.804 V14.0.0, Mar. 2017, pp. 1-57.

(Continued)

*Primary Examiner* — Daniel G Dobson
(74) *Attorney, Agent, or Firm* — Birch, Stewart, Kolasch & Birch, LLP

(57) ABSTRACT

A coherent optical receiver comprises a local oscillator, a polarization-diversity actuator configured for modifying an optical signal output by the local oscillator and a 2×2 coupler for coupling the optical signal output by the polarization-diversity actuator and a modulated optical signal received from a coherent optical transmitter. The local oscillator thus provides a boosting effect to the amplitude-shift keying modulated optical signal. The coherent optical receiver comprises a controlling unit performing a domain-switching procedure acting on ellipticity main axis orientation and/or ellipticity phase shift for coarse control of the polarization-diversity actuator, and a phase-refining procedure acting on a controlled error signal injected in the phase of the optical signal output by the polarization-diversity actuator for fine control of the polarization-diversity actuator.

15 Claims, 5 Drawing Sheets

(56) References Cited

OTHER PUBLICATIONS

International Search Report (PCT/ISA/210) issued in PCT/JP2021/048073, dated Apr. 25, 2022.
ITU, "IMT Vision-Framework and overall objectives of the future development of IMT for 2020 and beyond", Recommendation Sector of ITU, ITU-R M.2083-0, Sep. 2015, pp. 1-19 (total 21 pages).
Kazuro Kikuchi, "Fundamentals of Coherent Optical Fiber Communications", IEEE Journal of Lightwave Technology, vol. 34, No. 1, Jan. 1, 2016, pp. 157-179.
Noé et al., "Endless Polarization Control Systems for Coherent Optics", IEEE Journal of Lightwave Technology, vol. 6, No. 7, Jul. 1988, pp. 1199-1208.
Written Opinion of the International Searching Authority (PCT/ISA/237) issued in PCT/JP2021/048073, dated Apr. 25, 2022.

\* cited by examiner

COHERENT OPTICAL RECEIVER

TECHNICAL FIELD

The present invention generally relates to optical communications and more particularly to coherent optical receivers for optical communications.

BACKGROUND ART

Optical communications, such as passive optical networks (PONs), are increasingly used to give network access (typically Internet access) to residential or office gateways, or data centers, in the scope of FTTH ("Fiber To The Home") technology deployment. Optical communications may also be used to ensure mobile infrastructure backhauling for instance in the scope of the deployment of 3G ($3^{rd}$ generation) or 4G ($4^{th}$ generation) mobile technologies using typically Point-to-Point arrangements.

With the emerging 5G ($5^{th}$ generation) mobile technology, fronthauling is about to appear and the needs in terms of data rate capabilities are significantly increased. One may refer to the International Mobile Telecommunications (IMT) recommendations ITU-R M.2083 (Reference 1). In such a framework, fronthauling is achieved by moving upstream in the mobile infrastructure processing functions that were previously performed at base stations or nearby in the 3G or 4G mobile technologies. It is referred to as split options in the specifications 3GPP TR 38.801 V 14.0.0 (Reference 2, see more particularly therein Section 11 and Table A-1).

Therefore, 5G mobile technology has a wider set of requirements as compared to FTTH requirements that have driven optical access technology evolution until now. 5G mobile technology translates thus into higher nominal data rates, reduced latency and denser deployment, among others. This translates to higher nominal data rates for optical access but also expected split ratio greater than 1:128 whereas FTTH split ratio is typically 1:64 with current PON systems.

To cope with this trend, coherent optical transmission is envisaged. Coherent optical transmission is a technique that uses modulation of amplitude and phase of light to enable transporting high volume of data over an optical fiber. Digital Signal Processing (DSP) is then typically used in order to achieve robust performance of coherent transmission over the optical fiber.

Coherent optical transmission is well-known since it has revolutionized the metro and core network segments: beyond its ability to capture the entire diversity of the channel and thus its ability to gain high spectral efficiency, one can cites good optical receiver sensitivity and good wavelength selectivity as well.

Fundamentals of coherent optical transmissions as used in metro and core network segments can be found in Reference 3. This document depicts a coherent optical receiver employing phase and polarization diversities. Two phase-diversity homodyne receivers based on 90° optical hybrid power splitters in order to retrieve phase and quadrature components of injected coherent optical signal are placed in a polarization-diversity configuration, with usage of a common Local Oscillator (see more particularly therein FIG. 9). DSP arrangement has to be complementarily used in order to retrieve modulated symbols by digitally processing phase and polarization diversities output so as to restore complex signal amplitude in a stable manner despite fluctuations of carrier phase and signal state of polarization. To do so, the DSP arrangement comprises an anti-aliasing filter, a 4-channel Analogue-to-Digital Converter (ADC), a Frequency Domain Equalizer (FDE) enabling symbol rate extraction for driving back the ADC, an adaptive Finite Impulse Response (FIR) equalizer enabling clock phase recovery and a carrier phase estimator (see more particularly therein FIG. 18).

One main issue with coherent optical transmissions is that transmission over long-range optical fibers implies slow but large state-of-polarization changes large enough to be sensible at the coherent optical receiver. To ensure transmission continuity, two alternative approaches are used in order to avoid signal fading due to mismatch between the state of polarization of the signal received via the optical fiber and the state of polarization of the local oscillator. One approach is to compensate for change of state of polarization induced by the long-range optical fiber using complex Digital Signal Processing with full diversity polarization receivers. The other approach is to track the state of polarization using Optical Phase Lock Loop (OPLL), for instance in the case where full polarization diversity cannot be recovered. Both approaches lead to complex analog and/or digital arrangements with at least two analog branches. One may for example refer to Reference 4. As disclosed therein, tracking state of polarization thus typically supposes endless polarization transformer coupled with an adaptive control loop, which is a rather complex and costly arrangement.

It appears from the foregoing explanation that intrinsic theoretical and hardware implementation applied to metro and core network segments are not compatible with low design complexity, low power consumption, low manufacturing cost and complexity, low deployment cost and complexity, and small size, which are key requirements in the network access segment. Indeed, the quantity of equipment to install in the network access segment is far higher than in the metro and core network segments, especially to meet geographical density expectations of base stations in 5G mobile technology, and furthermore, the places to install such equipment are often particularly limited in terms of space (home device, base stations installation sites . . . ). Furthermore, the optical transmissions in metro and core network segments suffer from noise presence due to signal amplification used to cover point-to-point long distances. On the contrary, the optical transmissions in network access segments operate on shorter distances but suffer from low signal strength (quantity of photons received by the optical receiver) due to split ratio considerations, and thus optical receiver sensitivity is a main concern. Therefore, the coherent optical transmissions technology as used in the metro or core network segments is not suitable for 5G mobile technology.

In addition to the scope of the 5G mobile technology, coherent optical transmissions might be suitable for FTTH evolution. Indeed, the increasing demand for high-speed Internet gives rise to increasing the split ratio of current PON systems in addition to higher data rates. However, as for the deployment of base stations in the 5G mobile technology, Optical Network Units (ONUs) as used in such PON systems require low design complexity, low power consumption, low manufacturing cost and complexity, low deployment cost and complexity, and small size, since they are deployed in users' premises or nearby. Furthermore, as for the 5G mobile technology context, the optical transmissions in metro and core network segments suffer from noise presence due to signal amplification used to cover point-to-point long distances. On the contrary, the optical transmissions in network access segments operate on shorter distances but suffer from low signal strength (quantity of photons received by the optical receiver) due to split ratio considerations, and thus optical receiver sensitivity is a main concern. Therefore, the coherent optical transmissions technology as used in the metro or core network segments is not suitable for FTTH evolution, either.

It is therefore desirable to provide a cost-effective solution of coherent optical receiver suitable for access network considerations. It is desirable to provide a solution that is as simple as possible.

REFERENCES

[Reference 1]
"*IMT Vision: Framework and overall objectives of the future development of IMT for 2020 and beyond*", released in September 2015.
[Reference 2]
"*Study on new radio access technology: Radio access architecture and interfaces*", released in March 2017.
[Reference 3]
"*Fundamentals of Coherent Optical Fiber Communications*", K. Kikuchi, Journal of Lightwave Technology, vol. 34, n°1, released in January 2016.
[Reference 4]
"*Endless Polarization Control Systems for Coherent Optics*", Noé et al., IEEE Journal of Lightwave Technology, vol. 6, n°7, pp. 1199-1207, released in July 1988.

SUMMARY OF INVENTION

To that end, it is proposed a coherent optical receiver intended to receive an amplitude-shift keying modulated optical signal from a coherent optical transmitter, comprising: a local oscillator; a polarization-diversity actuator configured for modifying an optical signal output by the local oscillator so as to form an optical signal with elliptical polarization with main axis orientation $\varphi_l$ and ellipticity phase shift $\psi_l$; a 2×2 coupler, having one input aiming at receiving the amplitude-shift keying modulated optical signal received from the coherent optical transmitter and the other input receiving another optical signal which is output by a set formed by a local oscillator and the polarization diversity actuator, so as to enable the local oscillator to provide a boosting effect to the amplitude-shift keying modulated optical signal received from the coherent optical transmitter, the 2×2 coupler further having one output connected to a set formed by a photodiode followed by a Direct Current filter removing a continuous component of an analog electrical signal output by the photodiode; a transimpedance amplifier converting current electrical signal output by the Direct Current filter into voltage electrical signal; a controlling unit in form of electronic circuitry configured for performing a domain-switching procedure instructing a configuration change of the polarization diversity actuator by modifying the ellipticity main axis orientation $\varphi_l$ and/or the ellipticity phase shift $\psi_l$ when the voltage electrical signal output by the transimpedance amplifier is below or equal to a predetermined first threshold THdsp corresponding to a predetermined percentage of theoretical maximum achievable by the boosting effect. Furthermore, the electronic circuitry is further configured for performing a phase-refining procedure inserting a controlled error signal in the phase of the optical signal output by the set formed by the local oscillator and the polarization diversity actuator, and adjusting a static component of the controlled error signal toward a maximum voltage electrical signal output by the transimpedance amplifier. Thus, by using such a single-branch coherent optical receiver, no complex Digital Signal Processing and no Optical Phase Lock Loop is used, and therefore cost-effective solution is provided for access network considerations. Moreover, the phase-refining procedure enables optimizing coarse configuration provided by the domain-switching procedure.

In a particular embodiment, during domain-switching procedure, the modification of the ellipticity main axis orientation $\varphi_l$ is performed by applying a predefined shift equal to $\pi/4$ and the modification of the ellipticity phase shift $\psi_l$ is performed by applying a predefined shift equal to $\pi/2$. Thus, recovering effective boosting effect (thanks to boosting terms provided by the local oscillator) is easily achieved.

In a particular embodiment, the polarization-diversity actuator comprises a variable waveplate for enabling modification of the ellipticity main axis orientation $\varphi_l$ and for enabling modification of the ellipticity phase shift $\psi_l$. Thus, configuration modification is easily implemented, at low complexity and cost.

In a particular embodiment, the electronic circuitry is configured to implement an automatic configuration of a standby time period between successive executions of the domain-switching procedure, comprising: a monitoring of evolution of the electrical signal output by the transimpedance amplifier is first continuously performed in the scope of the domain-switching procedure; history of polarization state related variations is tracked by the monitoring and a time period between instructed successive changes in ellipticity parameter is monitored; once evolution of polarization state variations becomes stable, the stand-by time period between successive executions of the domain-switching procedure is defined so as to be lower than a stabilized time period between successive crossings of the predetermined first threshold THdsp. Thus, energy of the coherent optical receiver can be preserved during the standby time period between successive executions of the domain-switching procedure, and the standby time period is automatically defined.

In a particular embodiment, the electronic circuitry is configured to implement an automatic configuration of a standby time period between successive executions of the phase refining procedure, comprising: a monitoring of evolution of the electrical signal output by the transimpedance amplifier is first continuously performed in the scope of the phase-refining procedure; history of time periods between successive crossings of a predetermined second threshold THprp is monitored; the stand-by period between successive executions of the phase-refining procedure is defined so as to be lower than a stabilized time period between successive crossings of the predetermined second threshold THprp. Thus, energy of the coherent optical receiver can be preserved during the standby time period between successive executions of the phase-refining procedure, and the standby time period is automatically defined.

In a particular embodiment, the controlled error signal is a modulated signal. Thus, the controlled error signal can be easily tracked in the voltage electrical signal output by the transimpedance amplifier.

In a particular embodiment, the controlled error signal is a modulation on the phase of the optical signal output by the set formed by the local oscillator and the polarization diversity actuator, which can be expressed under the following form:

$$\phi_0 + \Delta\phi_0 \cos(\Omega t + \varphi)$$

wherein $\phi_0$ is said static component of the controlled error signal. Thus, the controlled error signal can be easily generated.

In a particular embodiment, during the phase-refining procedure, the electronic circuitry is configured for monitoring transimpedance amplifier output variations at a frequency defined by $\Omega$ and for adjusting $\phi_0$ toward reaching the maximum voltage electrical signal output by the transimpedance amplifier where $\phi_0$ equals to $\phi_{max}$.

In a particular embodiment, the electronic circuitry is configured for transferring mitigation of the static component $\phi_0$ by modifying the ellipticity phase shift $\psi_I$ so as to compensate for $\phi_{max}$ and further by resetting $\phi_0$. Thus, dynamics of a modulator used for generating the controlled error signal are preserved.

In a particular embodiment, the electronic circuitry is configured for transferring mitigation of the static component $\phi_0$ in the case where the maximum voltage electrical signal at the output of the transimpedance amplifier does not vary beyond a predetermined third threshold THmax over a time period that corresponds to bandwidth of variable waveplate that is used in the polarization-diversity actuator for enabling modification of the ellipticity main axis orientation $\phi_I$ and for enabling modification of the ellipticity phase shift $\psi_I$. Thus, transfer of the mitigation of the static component $\phi_0$ is performed once stabilization is reached.

In a particular embodiment, the electronic circuitry is configured for monitoring evolution of phase detuning so as to detect a continuous and monotonic evolution of phase detuning and adjusts wavelength configuration of the local oscillator so as to compensate for the continuous and monotonic evolution of phase detuning detected. Thus, refinement of the phase of the optical signal output by the set formed by the local oscillator and the polarization-diversity actuator is not untimely triggered due to wavelength drift.

In a particular embodiment, once wavelength adjustment has been performed, the electronic circuitry is configured for reinitiating the phase-refining procedure. Thus, new optimization easily takes into account wavelength adjustment.

In a particular embodiment, the electronic circuitry is configured for reinitiating the phase-refining procedure at time intervals during reconfiguration transitory period of the local oscillator. Thus, phase refinement is smoothly performed during the reconfiguration transitory period of the local oscillator.

In a particular embodiment, the coherent optical receiver further comprises a temperature sensor capturing temperature of the local oscillator and a look-up table that establishes a relationship between temperature drift and wavelength drift, and wherein the electronic circuitry is configured for monitoring evolution of temperature captured by the temperature sensor, for retrieving from the look-up table wavelength drift corresponding to temperature drift shown by the evolution of temperature and superimposing to the controlled error signal a contribution that is the opposite of phase evolution induced by the wavelength drift. Thus, wavelength drift effects on optical signal phase are easily managed and refinement of the phase of the optical signal output by the set formed by the local oscillator and the polarization-diversity actuator is not untimely triggered due to wavelength drift.

It is further proposed an Optical Network Unit intended to be used in a Passive Optical Network, wherein the Optical Network Unit includes the coherent optical receiver for receiving an amplitude-shift keying modulated optical signal transmitted by a coherent optical transmitter included in an Optical Line Terminal of the Passive Optical Network. Thus, low complexity and cost Optical Network Unit solution is provided to Passive Optical Network infrastructures.

The characteristics of the invention will emerge more clearly from a reading of the following description of at least one example of embodiment, said description being produced with reference to the accompanying drawings.

DESCRIPTION OF EMBODIMENTS

It has to be noticed that, since wavelength and frequency are tied together through a direct inverse relationship, these two terms are indifferently used by the one skilled in the art, as they refer to the same concept.

Figure 1A:
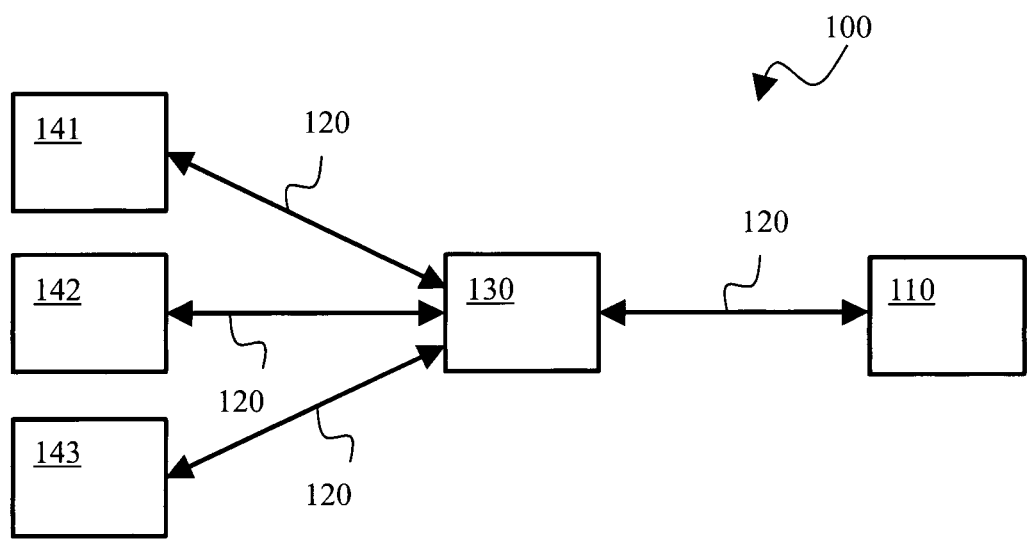
FIG. 1A schematically represents an arrangement of an optical communications system of passive optical network type, in which the present invention may be implemented.
Figure 1B:
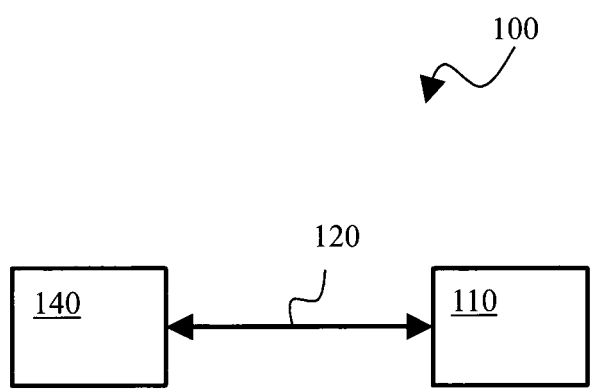
FIG. 1B schematically represents an arrangement of an optical communications system of point-to-point type, in which the present invention may be implemented.

The present invention can be applied for implementing a low complexity coherent optical receiver intended to receive and detect optical signals transmitted by a coherent optical transmitter. More particularly, the coherent optical receiver is suitable for receiving amplitude-shift keying (ASK) modulated optical signals. For example, the amplitude-shift keying (ASK) modulated optical signals are Non-Return-to-Zero On-Off Keying (NRZ-OOK) modulated optical signals. FIGS. 1A and 1B described hereafter introduce examples of contexts in which the present invention may be beneficial.

FIG. 1A schematically represents an arrangement of an optical communications system 100 of passive optical network (PON) type, in which the present invention may be implemented.

The optical communications system 100 in FIG. 1A comprises a master device 110, typically an OLT (Optical Line Terminal) device, and a plurality of slave devices 141, 142, 143, typically ONU (Optical Network Units) devices.

The optical communications system 100 in FIG. 1A may further comprise at least one spectral splitter device 130 and/or at least one power splitter.

Each spectral splitter device 130 comprises a pair of optical band-pass sets of filters for each PON, aiming at filtering respective wavelength bands, and thus enabling said spectral splitter device 130 to perform Wavelength Division Multiplexing (WDM). It can be noted that an equivalent arrangement can be obtained by sticking filtering films on reception diodes instead of using the spectral splitter device 130.

Each power splitter enables increasing the quantity of slave devices that can be connected to the master device 110, by dividing input signal power by the quantity of outputs towards the slave devices connected thereto. Each output of the power splitter device thus transmits the same optical information as received as input signal, the power splitter device having only impact on signals power.

The slave devices 141, 142, 143 are interconnected with the master device 110 via the at least one spectral splitter device 130 and/or the at least one power splitter using optical fibers 120.

In the context of PON, ONUs are typically intended to be located at end-user households for FTTH services, and OLT enables ONUs to access a metropolitan or a core network (not shown). Such PON may also be used for mobile network infrastructures services.

FIG. 1B schematically represents an arrangement of an optical communications system of point-to-point type, in which the present invention may be implemented.

The optical communications system 100 in FIG. 1B comprises a master device 110 and a slave device 140. The master device 110 and the slave device 140 are interconnected using optical fiber 120.

In mobile network fronthauling infrastructure, the slave device 140 is typically located at a remote radio head location and the master device 110 is located at a baseband unit (BBU) location. Such arrangement may also be used for mobile network backhauling infrastructure between BBUs and core network access terminals.

In both arrangements of FIGS. 1A and 1B, optical transmissions of information from the master device 110 to one or more slave devices are referred to as downlink transmissions and in the reverse direction to as uplink transmissions.

In both arrangements of FIGS. 1A and 1B, it is desirable to install a low complex and cost-effective optical receiver, at least in the slave devices 140, 141, 142, 143, and potentially in the master device 110. Moreover, it is desirable that the optical receiver provides high sensitivity so as to cope with potential low signal strength.

Figure 2:
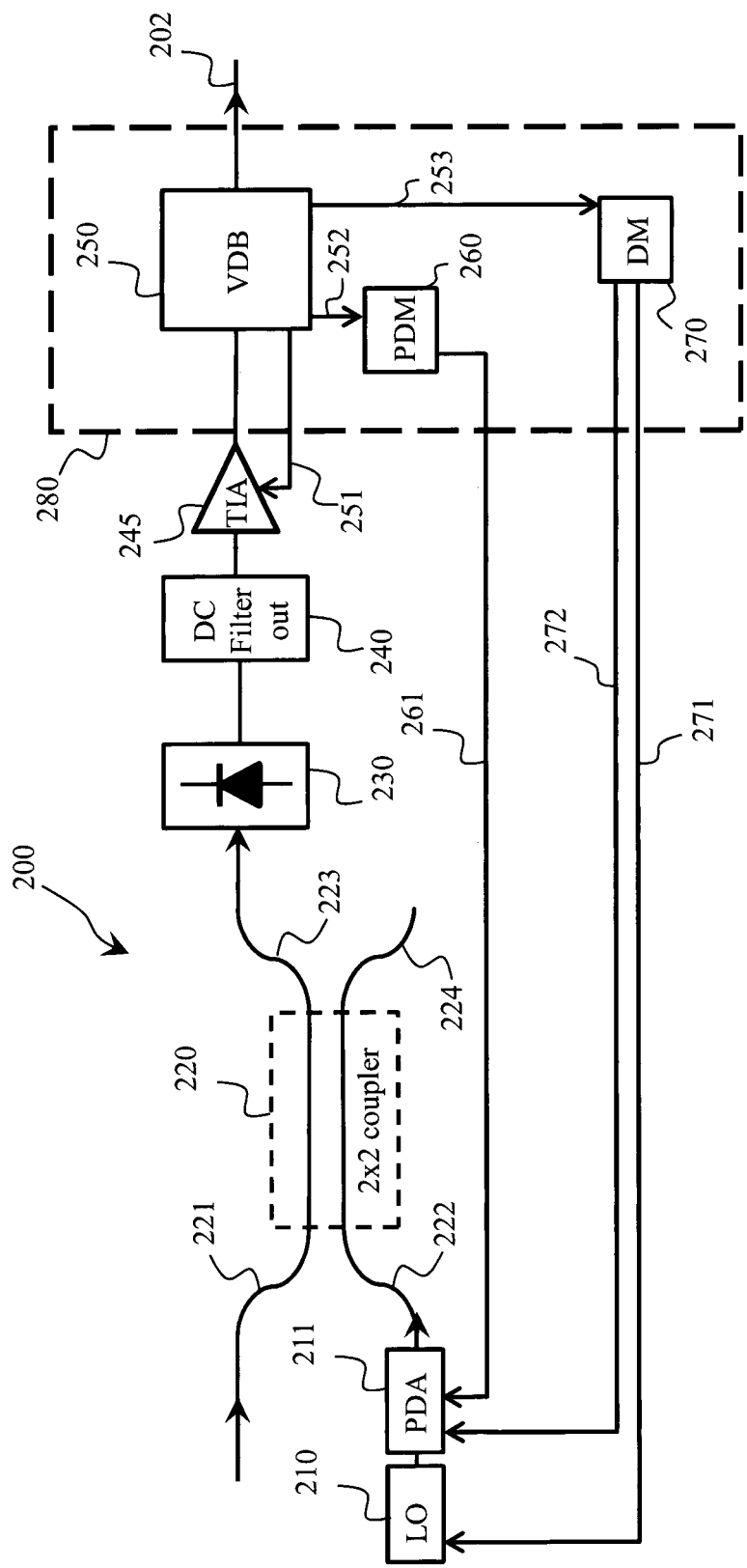
FIG. 2 schematically represents a coherent optical receiver arrangement that can be used in the optical communications system of FIG. 1A or FIG. 1B.

FIG. 2 schematically represents an arrangement of coherent optical receiver 200 which can be used in the optical communications system 100 of FIG. 1A or FIG. 1B. The coherent optical receiver 200 outputs signals 202 to be processed for demodulation.

According to the arrangement shown in FIG. 2, the coherent optical receiver 200 comprises a 2×2 coupler 220. For example, the 2×2 coupler 220 is a fiber fused coupler or a directional coupler.

On one input 221 of the 2×2 coupler 220 is injected an optical signal transmitted by a coherent optical transmitter. On the other input 222 of the 2×2 coupler 220 is injected another optical signal which is output by a set formed by a local oscillator LO 210 and a polarization diversity actuator PDA 211.

The local oscillator LO 210 is a laser diode or an arrangement comprising a laser diode. It has to be noted that vertical-cavity surface-emitting laser (VCSEL) may be used as local oscillator.

To one output 223 of the 2×2 coupler 220 is connected a set formed by a photodiode 230 followed by a DC (Direct Current) filter 240 of the coherent optical receiver 200. The DC filter 240 is an arrangement removing the continuous component of the analog electrical signal output by the photodiode 230. The other output 224 of the 2×2 coupler 220 is left unused. The other output 224 of the 2×2 coupler 220 may be used for detection improvement or for other purposes. Doing so leads to a single analog branch coherent optical receiver.

Generally speaking, a polarized optical signal E(t) can be written in the Jones representation as follows:

$$E(t) = E_0 e^{i(2\pi \omega t + \phi)} \begin{pmatrix} \cos \varphi \\ e^{i\psi} \sin \varphi \end{pmatrix}$$

which corresponds to a vector that describes an ellipse in a transverse plane with respect to the propagation direction of the optical signal. In the formula above, $E_0$ is the amplitude of the optical signal, $\omega$ is the wavelength of the optical signal and $\phi$ is the phase of the optical signal. Moreover, in the formula above, $\varphi \in [0;\pi[$ is the orientation of the main axis of the polarization ellipse and $\psi$ is the ellipticity phase shift. We can find the particular cases of $\psi=0$ for a linear polarization and of $$\psi = (2k+1)\frac{\pi}{2},$$

$k \in \mathbb{N}$, for a circular polarization.

Thus, on the output 223 of the 2×2 coupler 220, the 2×2 coupler 220 provides the following combined signal C(t):

$$C(t) = E_{0l} e^{i(2\pi \omega_l t + \phi_{lo})} \begin{pmatrix} \cos \varphi_l \\ e^{i\psi_l} \sin \varphi_l \end{pmatrix} + E_{0s} e^{i(2\pi \omega_s t + \phi_s)} \begin{pmatrix} \cos \varphi_s \\ e^{i\psi_s} \sin \varphi_s \end{pmatrix}$$

wherein the optical signal parameters with the index s concern the optical signal received from the coherent optical transmitter, with signal amplitude $E_{0s}$ modulated at modulation symbol duration rate, and the optical signal parameters with the index l concern the optical signal output by the set formed by local oscillator LO 210 and the polarization diversity actuator PDA 211, with non-modulated signal amplitude $E_{0l}$, and finally the optical signal parameters with the index lo concern the optical signal output by the local oscillator LO 210 (here the phase $\phi_{lo}$).

It has to be understood here that the optical signal output by the set formed by local oscillator LO 210 and the polarization diversity actuator PDA 211 is not modulated with respect to transmission of information, but the amplitude $E_{0l}$ may be changed in order to help improving optical detection dynamics. It thus means that variations of the signal amplitude $E_{0l}$ contain no meaningful information as such.

It can be noted that, when $E_{0l}=E_{0s}$, $\omega_l=\omega_s$, $\phi_l=\phi_s$ and $\phi_{lo}=\phi_s+(2k+1)\pi$, $k \in \mathbb{N}$, then the combined signal C(t) vanishes to zero at any time. And it can be further noted that such a situation occurs only for two fields that differ only by a phase shift (same amplitude, same frequency, same state of polarization with fields shifted by $\pi$).

Thus, considering amplitude shift keying optical signals and further considering the impact of the DC filter 240 at the output of the photodiode 230, the current i(t) output by the DC filter 240 can be expressed as follows:

$$i(t) = (E'_{0s})^2$$
$$+ 2E'_{0s}E'_{0l}\cos(\Delta\varphi)\cos\left(\frac{\Delta\psi}{2}\right)\cos\left(2\pi\Delta vt + \Delta\phi + \frac{\Delta\psi}{2}\right)$$
$$+ 2E'_{0s}E'_{0l}\cos(\Delta\varphi + 2\varphi_l)\sin\left(\frac{\Delta\psi}{2}\right)\sin\left(2\pi\Delta vt + \Delta\phi + \frac{\Delta\psi}{2}\right)$$

wherein $E_{0s}'=R \cdot E_{0s}$ and $E_{0l}'=R \cdot E_{0l}$ with $R<1$ being a conversion rate by the photodiode 230 of incident photons into electrons, wherein $\Delta\varphi=\varphi_s-\varphi_l$ is a difference in orientation of the main axes of the polarization ellipses, wherein $\Delta v=\omega_s-\omega_l$ is a wavelength detuning, wherein $\Delta\phi=\phi_s-\phi_{lo}-\xi_c$ is a phase shift between the optical signal received from the coherent optical transmitter and the optical signal output by the local oscillator LO 210 (phase $\phi_{lo}$) further taking into account of a phase shift $\xi_c$ introduced by the 2×2 coupler 220 between its inputs, with typically $\xi_c=\pi/2$, and wherein $\Delta\omega=\omega_s-\psi_l$ is a difference in ellipticity phase shift.

In the equation of i(t) above, the following terms:

$$2E'_{0s}E'_{0l}\cos(\Delta\varphi)\cos\left(\frac{\Delta\psi}{2}\right)\cos\left(2\pi\Delta vt + \Delta\phi + \frac{\Delta\psi}{2}\right)$$

and $$2E'_{0s}E'_{0l}\cos(\Delta\varphi + 2\varphi_l)\sin\left(\frac{\Delta\psi}{2}\right)\sin\left(2\pi\Delta vt + \Delta\phi + \frac{\Delta\psi}{2}\right)$$

provide a boosting effect, thanks to the set formed by local oscillator LO 210 and the polarization diversity actuator PDA 211, and are referred to as boosting terms.

Control of the polarization diversity actuator PDA 211 thus enables adjusting the boosting effect. In order to control the polarization diversity actuator PDA 211, the coherent optical receiver 200 further comprises a controlling unit 280 in the form of electronic circuitry, which is present at output of the DC filter 240 and loops back to the polarization diversity actuator PDA 211 via a line 261. The controlling unit 280 may further also control the local oscillator LO 210 and therefore loop back to the local oscillator LO 210 via at least one line, for example a line 271.

The electronic circuitry forming the controlling unit 280 may be a chip or chipset, such as an FPGA (Field-Programmable Gate Array) or an ASIC (Application-Specific Integrated Circuit). In a variant, the electronic circuitry forming the controlling unit 280 may be a processor (microcontroller, a DSP (Digital Signal Processor) . . . ) accompanied by at least one memory. After being powered on, the processor is capable of reading instructions from the memory and executing these instructions for implementing functions of the controlling unit 280. In this case, the functions of the controlling unit 280 are in software form, which may be stored on a non-transitory storage medium, such as an SD (Secure Digital) card.

A transimpedance amplifier TIA 245 is present between the DC filter 240 and the controlling unit 280, so as to convert input current (as output by the DC filter 240) to output voltage. Preferably, the controlling unit 280 loops back to the transimpedance amplifier TIA 245 for electrical gain control via a line 251.

The controlling unit 280 does not perform tracking of the state of polarization. In the case of the present invention, there is no need to precisely know the state of polarization of the optical signal received from the coherent optical transmitter, neither the state of polarization of the optical signal output by the set formed by the local oscillator LO 210 and the polarization diversity actuator PDA 211. In the scope of the present invention, the controlling unit 280 determines whether or not the state of polarization of the set formed by the local oscillator LO 210 and the polarization diversity actuator PDA 211 is suitable for obtaining operable boosting terms, and if not (without knowing which relative states of polarization led to such situation), the controlling unit 280 adjusts in response the configuration of the polarization diversity actuator PDA 211. There is no need to determine the exact states of polarization of the optical signals and a single analog branch is sufficient to do so, which minimizes analog complexity. Moreover, no optical phase lock loop is needed, and no complex digital signal processing is needed, which further minimizes complexity. Operable boosting terms are boosting terms greater than, or equal to, a predefined threshold percentage (e.g., 20%) of their theoretical maximum; which is the maximum of the strength of the optical signal output by the local oscillator LO 210.

It can be noted from the formula above that i(t) equals to zero independently of $\varphi_s$ and $\varphi_l$ when $E_{0s}'=E_{0l}'$ (which means that $E_{0s}=E_{0l}$) with further $\Delta\phi=(2q+1)\pi$, $q\in\mathbb{N}$, and $\Delta\psi=2k\pi$, $k\in\mathbb{N}$.

It can be noted from the formula above that i(t) also equals to zero independently of $\varphi_s$ and $\varphi_l$ when $E_{0s}'=E_{0l}'$ (which means that $E_{0s}=E_{0l}$) with further $\Delta\phi=(2q+1)\pi$, $q\in\mathbb{N}$, and $\Delta\psi=(2k+1)\pi$, $k\in\mathbb{N}$.

It thus means that, in these two cases, the optical signal received from the coherent optical transmitter and the optical signal output by the set formed by the local oscillator LO 210 and the polarization diversity actuator PDA 211 are in the same state of polarization but with a phase shift of $\pi$. In view of the conditions to face these cases, they might be considered as marginally occurring, since they might be faced in one sample among successive samples in a modulation symbol, which can be easily recovered during demodulation operations. Nevertheless, providing a solution, as herein detailed in at least one particular embodiment, when these cases are faced improves coherent optical reception performance.

More importantly, the local oscillator LO 210 enables boosting the optical signal coming from the optical fiber, as far as the following situations are not met:

$$\cos(\Delta\varphi) = 0 \text{ and } \cos(\varphi_s + \varphi_l) = 0$$
$$\cos(\Delta\varphi) = 0 \text{ and } \sin\left(\frac{\Delta\psi}{2}\right) = 0$$
$$\cos\left(\frac{\Delta\psi}{2}\right) = 0 \text{ and } \cos(\varphi_s + \varphi_l) = 0.$$

Apart from these situations, the local oscillator LO 210 thus enables increasing sensitivity of the optical receiver, which, among others, enables improving split ratio over PON and enables increasing transmission data rate. It appears to be unnecessary to provide an exhaustive and systematic polarization tracking and polarization transformation (either in an analog or digital way) to get an effective boosted signal at symbol granularity.

In order to avoid the situations above, the polarization diversity actuator PDA 211 is controlled by the controlling unit 280 so as to modify on demand the optical signal as output by the local oscillator LO 210. In other words, controlling the polarization diversity actuator PDA 211 enables escaping the situations above when encountered. Indeed, even a small change of state of polarization of the signal injected in the input 222 of the 2×2 coupler 220 creates enough difference so that at least one of the boosting terms does not equal zero. Indeed, a boosting effect is obtained once at least one of these boosting terms does not equal zero and further when these terms do not compensate for each other.

Thus, the main function of the controlling unit 280 is to ensure that the electrical signal i(t) does not vanish to zero while the optical signal received from the coherent optical transmitter contains useful information and thus to ensure that the boosting effect supposed to be provided by the local oscillator LO 210 is maintained as much as possible above the predefined threshold percentage mentioned above.

Once the controlling unit 280 detects that the electrical signal output by the transimpedance amplifier TIA 245 is below a predetermined threshold THdsp, the controlling unit 280 controls the polarization diversity actuator PDA 211 so as to change the state of polarization of the optical signal output by the set formed by the local oscillator LO 210 and the polarization diversity actuator PDA 211. The boosting effect is consequently obtained in the case where the optical signal received from the coherent optical transmitter contains useful information, since a sensitive change of the state of polarization would allow escaping the encountered situation where the electrical signal i(t) has vanished to zero although the optical signal received from the coherent optical transmitter contains useful information. It can be demonstrated that, in the worst case, the contribution related to the boosting terms is greater than the contribution of the optical signal received from the coherent optical transmitter as soon as the states of polarization of both optical signals injected in the 2×2 coupler 220 are shift by a value that is small percentage (e.g., 5%) of the distance between adjacent optimal relative states of polarization.

After several kilometers in the optical fiber, the state of polarization of the optical signal originally transmitted by the coherent optical transmitter is randomly distributed over the Poincaré sphere. Thus, the state of polarization of the optical signal as received by the coherent optical receiver 200 is very likely to be elliptical. Thus, the optical signal output by the set formed by the local oscillator LO 210 and the polarization diversity actuator PDA 211 is controlled to be elliptically polarized. Thus, in order to change the state of polarization of the optical signal output by the set formed by the local oscillator LO 210 and the polarization diversity actuator PDA 211 when the electrical signal i(t) falls in a zero region although an optical signal containing useful information is received from the coherent optical transmitter, the controlling unit 280 instructs the polarization diversity actuator PDA 211 to change at least one ellipticity parameter among the angle $\varphi_l$ of orientation of the main axis of the polarization ellipse and the ellipticity phase shift $\psi_l$ of the optical signal output by the set formed by the local oscillator LO 210 and the polarization diversity actuator PDA 211. It enables making operable the boosting terms and recovering a sensitive photocurrent. In a particular embodiment, the controlling unit 280 instructs the polarization diversity actuator PDA 211 to change, by a predefined shift, the at least one ellipticity parameter among the angle $\varphi_l$ of orientation of the main axis of the polarization ellipse and the ellipticity phase shift $\psi_l$ of the optical signal output by the set formed by the local oscillator LO 210 and the polarization diversity actuator PDA 211.

In a particular embodiment, the predefined shift targets a stationary extremum of the electrical signal i(t). In this particular embodiment, the predefined shift is π/4 for the orientation axis $\varphi_l$ (and consequently for $\Delta\varphi$) and π/2 for the ellipticity phase shift $\psi_l$ (and consequently for $\Delta\psi$).

Thus, it is avoided that the current i(t) output by the DC filter 240 vanishes to zero, in a simple and cost-effective way. The procedure disclosed above performs coarse control of changes of the state of polarization without tracking state of polarization, and is herein referred to as "domain-switching procedure". The domain-switching procedure can be continuously executed or performed at time intervals, e.g., regular time intervals. For example, the domain-switching procedure is regularly performed on a time cycle basis which duration is defined so as to be lower than the time constant of polarization state variations. The order of magnitude of the time constant of polarization state variations is typically about one or few milliseconds, but may differ according to optical fiber deployment on field. For instance, the polarization state variations depend on vibrations incurred by the optical transmissions, and differs according to whether optical fiber deployment on field is aerial, deep in the ground or at short distance from ground surface.

In a particular embodiment, an automatic configuration of a standby period between successive executions of the domain-switching procedure is implemented. At first, a monitoring of evolution of the electrical signal output by the transimpedance amplifier TIA 245 is continuously performed in the scope of the domain-switching procedure. History of polarization state related variations is thus tracked and the time period between successive changes in ellipticity parameter ordered by the controlling unit 280 is monitored. Once the evolution of polarization state variations becomes stable, the controlling unit 280 defines a stand-by period between successive executions of the domain-switching procedure so as to be lower (e.g., half or with a predefined time margin) than a stabilized time period between successive crossings of the predetermined threshold THdsp (i.e., triggering changes in at least one ellipticity parameter ordered by the controlling unit 280). Thus, the time intervals between successive executions of the domain-switching procedure do not need to be specifically configured by an operator with respect to the effective deployment of the optical fiber on field.

Figure 5:
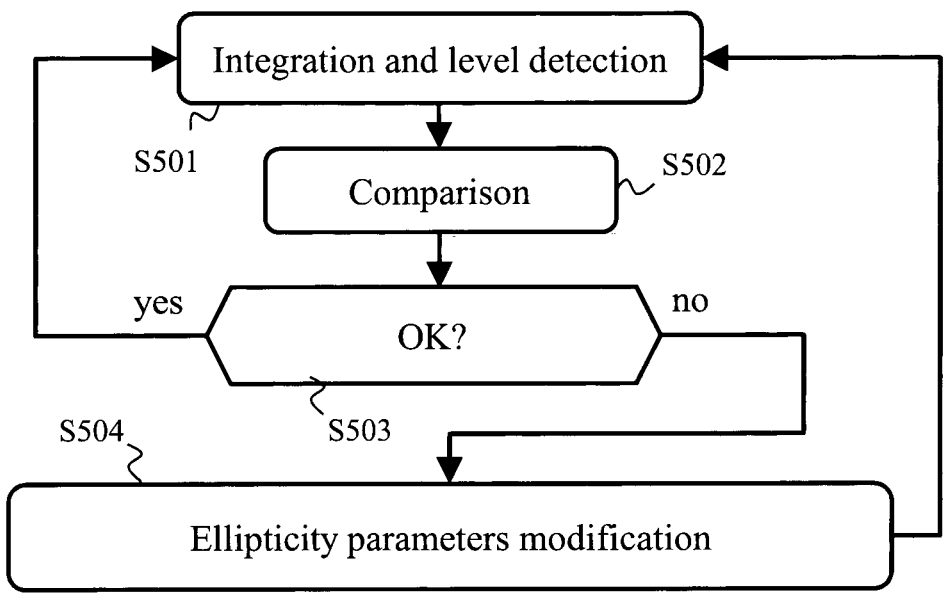
FIG. 5 schematically represents an algorithm performed by a controlling unit of the coherent optical receiver of FIG. 2 for adjusting configuration of the coherent optical receiver in a domain-switching procedure.

Further details about the domain-switching procedure are disclosed hereafter with respect to FIG. 5.

Refined control of changes of the state of polarization is performed by adjustment of the phase $\phi_l$ of the optical signal output by the set formed by the local oscillator LO 210 and the polarization diversity actuator PDA 211. To do so, a modulated signal is introduced by the polarization diversity actuator PDA 211 under control of the controlling unit 280 in a "phase-refining procedure".

The phase-refining procedure is preferably performed consequently to a change of at least one ellipticity parameter during execution of the domain-switching procedure. The phase-refining procedure may be performed independently of the domain-switching procedure. The phase-refining procedure can be executed when detecting that evolution of the electrical signal output by the transimpedance amplifier TIA 245 is above a predetermined threshold THprp. In a variant, the phase-refining procedure can be executed at time intervals, for example at regular time intervals.

As for the domain-switching procedure, a standby time period between successive executions of the phase-refining procedure may be automatically defined. At first, a monitoring of evolution of the electrical signal output by the transimpedance amplifier TIA 245 is continuously performed in the scope of the phase-refining procedure. The controlling unit 280 tracks history of time periods between successive crossings of the predetermined threshold THprp. Once stabilized, the controlling unit 280 defines a stand-by period between successive executions of the phase-refining procedure so as to be lower (e.g., half or with a predefined time margin) than a stabilized time period between successive crossings of the predetermined threshold THprp.

Figure 3:
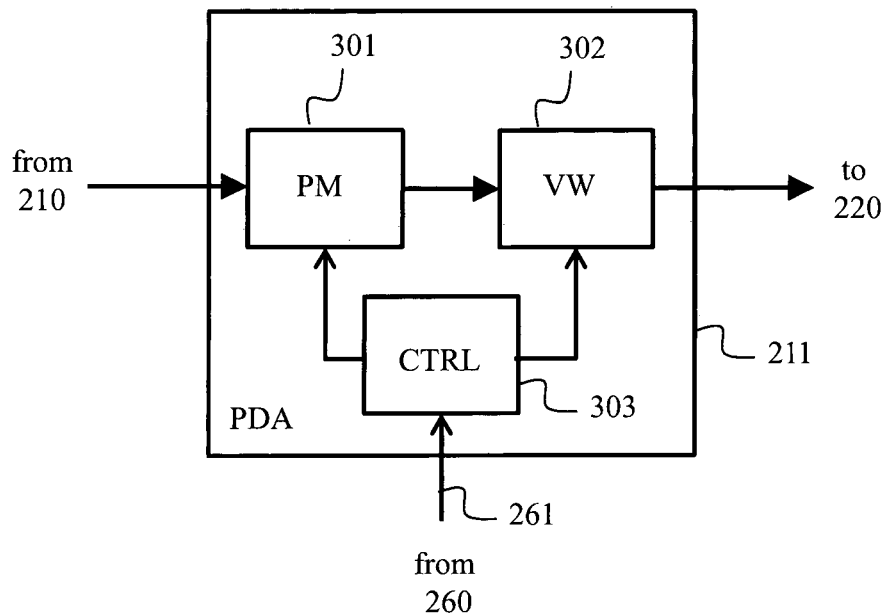
FIG. 3 schematically represents an arrangement of a polarization diversity actuator of the coherent optical receiver of FIG. 2.
Figure 6:
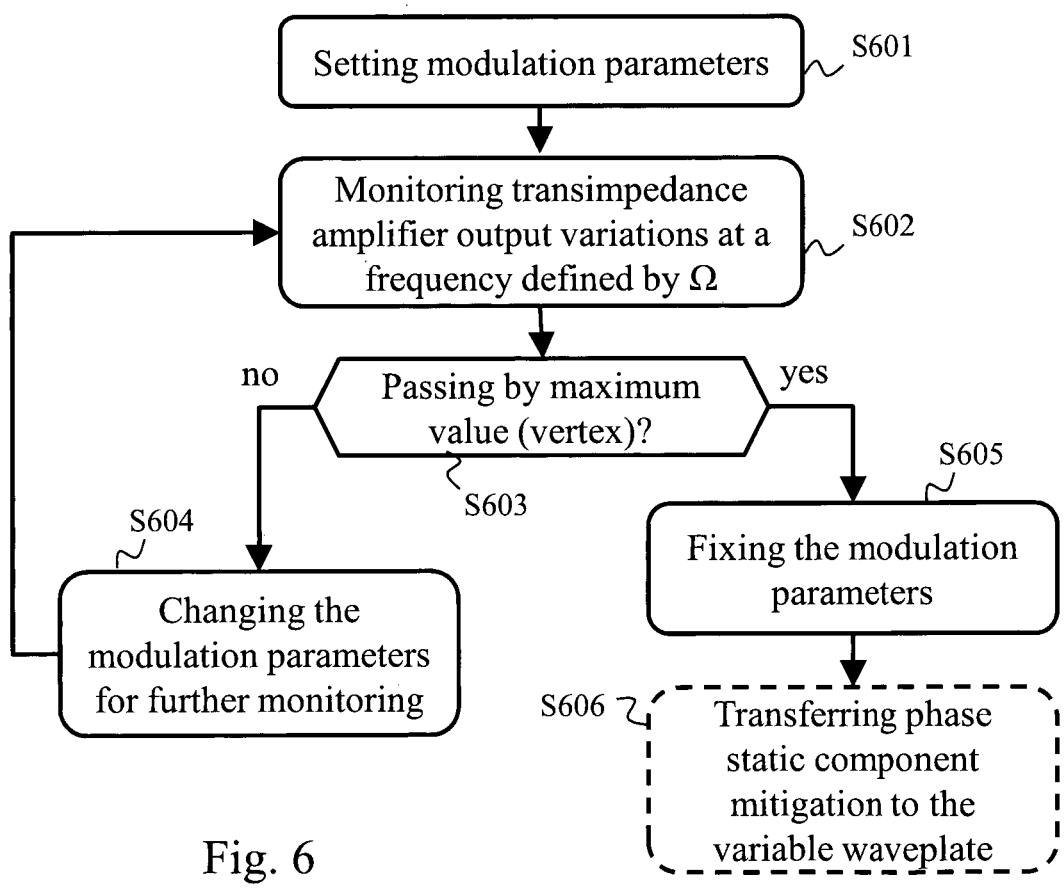
FIG. 6 schematically represents an algorithm performed by the controlling unit for adjusting configuration of the coherent optical receiver in a phase-refining procedure.

Determining how the phase $\phi_l$ has to be adjusted can be achieved thanks to a controlled error signal introduced by a phase modulator PM 301 in the polarization diversity actuator PDA 211, as detailed hereafter, more particularly with respect to FIGS. 3 and 6. Indeed, introducing an error signal as a stimulus on signal phase implies a noticeable effect on the current i(t) output by the DC filter 240, which enables finding the value of the phase $\phi_l$ which provides maximum signal strength.

In a particular embodiment, the controlled error signal is a modulation on the phase of the optical signal output by the set formed by the local oscillator LO 210 and the polarization diversity actuator PDA 211, which can be expressed as:

$$\phi_0 + \Delta\phi_0 \cos(\Omega t + \varphi).$$

It leads to the following expression of the current i(t) output by the DC filter 240, when considering the case of the local oscillator with a circular polarization with $\phi_l=\pi/2$ and $\psi_l=\pi/2$:

$$E'_{0s}E'_{0s} \sin(\varphi_s) \cos(2\pi\Delta\nu t + \Delta\phi + \phi_0 + \Delta\phi_0 \cos(\Omega t + \varphi) + \psi_s).$$

Therefore, $\phi_0$ enables adjusting a constant component of the phase $\phi_l$ and $\Delta\phi_0$ enables oscillating around this constant component, which creates noticeable variations of the current i(t) output by the DC filter 240. It can be noted that $\varphi$ fixes a temporal origin of the controlled error signal, which only matters for synchronous detection, as disclosed hereinafter.

Back to FIG. 2, the controlling unit 280 comprises, in a particular embodiment, a value decision block VDB 250, a polarization diversity manager PDM 260 and a detuning manager DM 270.

The value decision block VDB 250 analyzes the electrical signal output by the transimpedance amplifier TIA 245. The value decision block VDB 250 thus analyzes the voltage output by the transimpedance amplifier TIA 245. The value decision block VDB 250 compares the value of the voltage output by the transimpedance amplifier TIA 245 with the predefined threshold percentage (e.g., 20%) of the theoretical maximum achievable by the boosting effect, i.e., theoretical maximum achievable by the boosting terms. The theoretical maximum is defined according to the gain of the local oscillator LO 210, to the conversion rate R by the photodiode 230 of incident photons into electrons and to the gain of the transimpedance amplifier TIA 245. When the voltage output by the transimpedance amplifier TIA 245 is below the predefined threshold percentage of the theoretical maximum achievable thanks to the boosting terms, the value decision block VDB 250 acts to change configuration of the polarization diversity actuator PDA 211 so as to modify at least one ellipticity parameter among the angle $\varphi_l$ of orientation of the main axis of the polarization ellipse and the ellipticity phase shift $\psi_l$ of the optical signal output by the set formed by the local oscillator LO 210 and the polarization diversity actuator PDA 211.

The polarization diversity manager PDM 260 controls the polarization diversity actuator PDA 211 via the line 261. The polarization diversity manager PDM 260 converts instructions, which are received from the value decision block VDB 250 via a line 252 for modifying at least one ellipticity parameter among the angle $\varphi_l$ of orientation of the main axis of the polarization ellipse and the ellipticity phase shift $\psi_l$ of the optical signal output by the set formed by the local oscillator LO 210 and the polarization diversity actuator PDA 211, into adequate commands suitable to the polarization diversity actuator PDA 211 (e.g., drive voltage change). The polarization diversity manager PDM 260 consequently controls the polarization diversity actuator PDA 211 via the line 261.

The detuning manager DM 270 controls the local oscillator LO 210 via a line 271 and the polarization diversity actuator PDA 211 via a line 272. The detuning manager DM 270 converts instructions, which are received from the value decision block VDB 250 via a line 253 for modifying the wavelength of the optical signal output by the local oscillator LO 210, into adequate commands suitable to the local oscillator LO 210. The detuning manager DM 270 consequently controls the local oscillator LO 210 via the line 271. For instance, the detuning manager DM 270 adjusts the Peltier current when the local oscillator LO 210 is equipped with a Peltier module, or drive voltage when the local oscillator LO 210 is equipped with an optical ring resonator. The detuning manager DM 270 converts instructions, which are received from the value decision block VDB 250 via the line 253 (or another line dedicated thereto) for modifying parameters ($\phi_0$ and $\Delta\phi_0$ in the formula above) of the controlled error signal introduced by the phase modulator PM 301, into adequate commands suitable to the phase modulator PM 301.

Furthermore, the value decision block VDB 250 may provide instructions to the transimpedance amplifier TIA 245 via the line 251 for modifying electrical gain of the transimpedance amplifier TIA 245.

FIG. 3 schematically represents a particular embodiment of the polarization diversity actuator PDA 211. The particular embodiment of FIG. 3 is suitable for using a local oscillator providing a linearly-polarized optical signal, as commonly found off-the-shelf; however, the particular embodiment of FIG. 3 is also suitable for using a local oscillator providing a circular or elliptical polarization.

Low costs laser used nowadays in network access segment are typically semiconductor lasers that are linearly polarized. Such lasers can be used as the local oscillator LO 210. A way to transform a linear polarization into an elliptical polarization is to place a waveplate (also referred to as wavelength plate) at the output of the laser. Waveplates are based on birefringent materials with two orthogonal axes of different velocity, which induce a phase shift between the projections of a given field on the two axes of the birefringent materials. Injecting therein a linearly-polarized optical signal outputs an elliptically-polarized optical signal. It however may be taken into account that a waveplate couples both polarization ellipticity and phase shift, which means that phase shift between the optical signal output by the local oscillator LO 210 and the optical signal received from the coherent optical transmitter may also be impacted by the waveplate. Thus, in case the ellipticity has to be independently controlled with a waveplate, a compensating for phase shift may be applied on both axes of the optical signal output by the local oscillator LO 210 to counter the waveplate phase shift thus introduced.

In order to control ellipticity of the optical signal output by the set formed by the local oscillator LO 210 and the polarization diversity actuator PDA 211, a variable waveplate can be used. Variable waveplates are particular waveplates the phase shift of which between their slow (extraordinary) and fast (ordinary) axes can be controlled. Liquid crystal variable retarders and pockets cells are examples of variable waveplates. Tunable highly birefringent photonic Liquid Crystal Fibers can alternatively be used. Retardance is then tuned over a specified range by changing drive voltage.

According to the embodiment shown in FIG. 3, the optical signal issued from the local oscillator LO 210 is injected in the aforementioned phase modulator PM 301 that introduces the controlled error signal. The phase modulator PM 301 can be an electrically driven optical modulator based on Pockels cells, or a liquid crystal modulator, or a variable length waveguide, or a waveguide with variable optical index.

At the output of the phase modulator PM 301, the polarization diversity actuator PDA 211 further comprises a variable waveplate VW 302. The variable waveplate VW 302 is here used to adjust $\psi_l$ and thus to consequently mitigate the difference between $\psi_l$ and $\psi_s$.

The polarization diversity actuator PDA 211 may further comprise a controller CTRL 303 configured for interpreting instructions received from the controlling unit 280, and more particularly from the polarization diversity manager PDM 260 or the detuning manager DM 270, and for converting these instructions into commands (such as appropriate drive voltage) to the variable waveplate VW 302 and to the phase modulator PM 301 respectively.

In a variant, the controlling unit 280, and more particularly the polarization diversity manager PDM 260 and the detuning manager DM 270, directly transmits commands (such as appropriate drive voltage) to the variable waveplate VW 302 and to the phase modulator PM 301. In this case, the controlling unit 280, and more particularly the polarization diversity manager PDM 260, may comprise a look-up table LUT that links, on one hand, actuation of changes in $\varphi_l$ (and consequently in $\Delta\varphi$) and/or in $\psi_l$ (and consequently in $\Delta\psi$) and, on the other hand, commands to be applied to the polarization diversity actuator PDA 211, more particularly to the variable waveplate VW 302; moreover, the controlling unit 280, and more particularly the polarization diversity manager PDM 260, may comprise a look-up table LUT that links, on one hand, phase modulation parameters and, on the other hand, commands to be applied to the polarization diversity actuator PDA 211, more particularly to the phase modulator PM 301.

Figure 4:
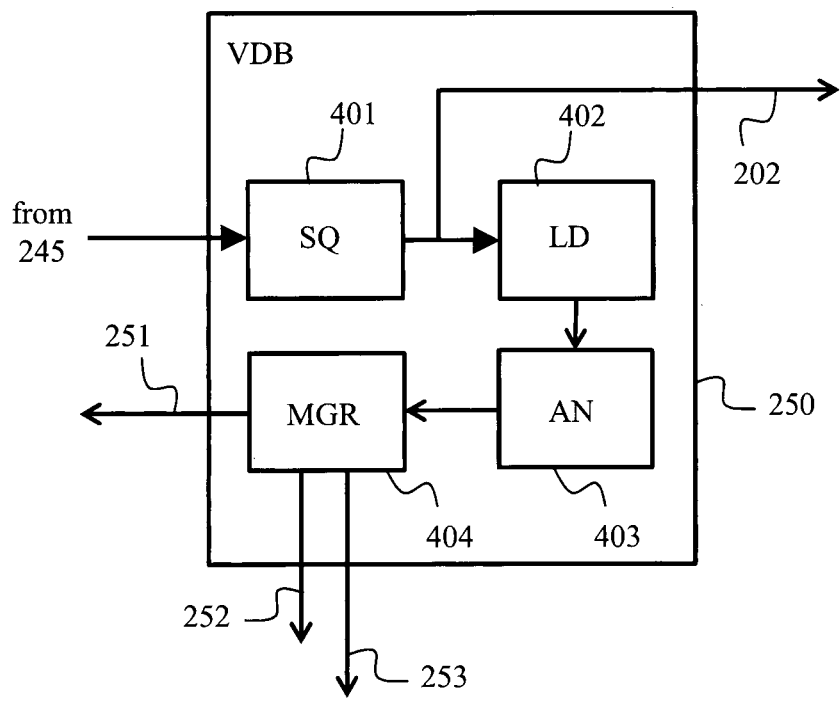
FIG. 4 schematically represents an arrangement of a value decision block of the coherent optical receiver of FIG. 2.

FIG. 4 schematically represents a particular embodiment of the value decision block VDB 250.

The value decision block VDB 250 comprises a level detector LD 402. The level detector LD 402 detects voltage output by the transimpedance amplifier TIA 245 and performs conversion into digital data more easily handled for further analysis.

The value decision block VDB 250 further comprises an analyzer AN 403. The analyzer AN 403 receives digital data from the level detector LD 402. The analyzer AN 403 compares the value of the voltage output by the transimpedance amplifier TIA 245 with the predefined threshold percentage (e.g., 20%) of the theoretical maximum achievable thanks to the boosting terms. The analyzer AN 403 then makes a decision regarding whether or not at least one action has to be taken in order to ensure that operable boosting terms are met.

The value decision block VDB 250 further comprises a manager MGR 404. The manager MGR 404 receives from the analyzer AN 403 instructions with respect to action to be taken. The manager MGR 404 consequently provides polarization diversity-related instructions to the polarization diversity manager PDM 260 via the line 252 and/or electrical gain control instructions to the transimpedance amplifier TIA 245 via the line 251 and/or phase tuning-related instructions to the detuning manager DM 270 via the line 253 and/or wavelength tuning-related instructions to the detuning manager DM 270 via the line 253.

In a preferred embodiment, the value decision block VDB 250 further comprises a squaring module SQ 401. The squaring module SQ 401 squares the electrical signal received from the transimpedance amplifier TIA 245 (i.e., the squaring module SQ 401 multiplies the input electrical signal by itself). It simplifies analysis performed by the analyzer AN 403, by ensuring that only positive values are handled (which is easier for comparing them in absolute value with a threshold). To do so, the squaring module SQ 401 is for example an analog amplifier with both inputs receiving the electrical signal received in input of the value decision block VDB 250. Usage of the squaring module SQ 401 further advantageously increases contrast for the boosting terms with respect to the optical signal received from the coherent optical transmitter.

On the contrary, operating without the squaring module SQ 401 enables implementing NRZ-OOK-alike demodulation based on negative minimum and positive maximum levels.

The value decision block VDB 250 outputs the signals 202 to be processed for demodulation. These signals may be the output of the squaring module SQ 401. These signals may simply be the output of the transimpedance amplifier TIA 245.

FIG. 5 schematically represents an algorithm performed by the controlling unit 280 for configuring the coherent optical receiver 200 in the scope of the domain-switching procedure. The controlling unit 280 continuously receives analog electrical signal from the transimpedance amplifier TIA 245.

In a step S501, the controlling unit 280 performs signal level detection with respect to the electrical signal output by the transimpedance amplifier TIA 245, as already explained above. The step S501 outputs digital representation, according to a sampling rate, of the analog electrical signal (voltage) output by the transimpedance amplifier TIA 245. Level detection preferably includes integration or averaging over a predetermined quantity of samples.

In a step S502, the controlling unit 280 performs comparison of the level detected in the step S501 with the predefined threshold percentage (e.g., 20%) of the theoretical maximum signal level which is achievable thanks to the boosting terms. As already mentioned, the theoretical maximum is defined according to the gain of the local oscillator LO 210, to the conversion rate R by the photodiode 230 of incident photons into electrons and to the gain of the transimpedance amplifier TIA 245. The conversion rate R by the photodiode 230 of incident photons into electrons is known to the controlling unit 280 by pre-configuration (e.g., in factory). When the gain of the local oscillator LO 210 is not defined (i.e., controlled) by the controlling unit 280, the gain of the local oscillator LO 210 is known to the controlling unit 280 by pre-configuration (e.g., in factory). When the gain of the transimpedance amplifier TIA 245 is not defined (i.e., controlled) by the controlling unit 280, the gain of the transimpedance amplifier TIA 245 is known to the controlling unit 280 by pre-configuration (e.g., in factory). Alternatively, the theoretical maximum signal level which is achievable thanks to the boosting terms is known to the controlling unit 280 by pre-configuration (e.g., in factory). Further alternatively, the applicable threshold THprp is known to the controlling unit 280 by pre-configuration (e.g., in factory). In this latter case, the pre-configured applicable threshold THprp remains a predefined threshold percentage (e.g., 20%) of the theoretical maximum signal level that is achievable thanks to the boosting terms, except that the effective value of the predefined threshold percentage (e.g., 20%) is not dynamically determined by the controlling unit 280. The predefined threshold percentage may change over time: for example, the controlling unit 280 is instructed by an application layer of the optical coherent receiver 200, or by a demodulator of the optical coherent receiver 200, that means signal-to-noise ratio of the electrical signal should be strengthened or, on the contrary, loosened.

In a step S503, the controlling unit 280 checks whether or not the comparison shows that the level detected in the step S501 is greater than, or equal to, the threshold THprp in question. When the level detected in the step S501 is lower than the threshold THprp in question, a step S504 is performed. When the level detected in the step S501 is greater than, or equal to, the threshold THprp in question, the step S501 is repeated. A waiting or standby time may be inserted before executing again the step S501. The duration of the waiting or standby time is less than the time observed with optical fibers to change polarization of transported optical signals in a predefined proportion in the polarization space. For instance, the waiting or standby time duration is 100 milliseconds.

In the step S504, the controlling unit 280 instructs a configuration change of the set formed by the local oscillator LO 210 and the polarization diversity actuator PDA 211, wherein the configuration change is modification of the ellipticity main axis orientation $\varphi_l$ and/or modification of the ellipticity phase shift $\psi_l$.

Then, the step S501 is repeated. No waiting time is preferably applied at that time, in order for the controlling unit 280 to determine whether another ellipticity modification of the optical signal output by the set formed by the local oscillator LO 210 and the polarization diversity actuator PDA 211 has to be performed.

As already mentioned, the domain-switching procedure enables coarse control of changes of the state of polarization without effectively tracking state of polarization. Fine control is provided by the phase-refining procedure disclosed hereafter.

FIG. 6 schematically represents an algorithm performed by the controlling unit 280 for adjusting configuration of the coherent optical receiver 200 in the scope of the phase-refining procedure.

In a step S601, the controlling unit 280 configures the polarization diversity actuator PDA 211 so as to set the modulation parameters defining the controlled error signal. More particularly, the controlling unit 280 configures the phase modulator PM 301 with respect to the modulation parameters $\phi_0$ and $\Delta\phi_0$. Regarding the parameter $\Omega$, it is set so as to correspond at a cycling period that is higher than polarization time constant (in the order of milliseconds) but lower than typical wavelength chirp or fast phase noise timescale (in the order of milliseconds microseconds). Modulation at hundreds of kHz can then be used.

At first, $\phi_0$ is set to 0 and $\Delta\phi_0$ is set to a variation of $\Delta\phi$ that corresponds to a predefined fraction of the threshold THprp that triggers the change of ellipticity parameter in the domain-switching procedure (e.g., half or a third of the threshold value) in order to limit probability that the photocurrent output of the DC filter 240 goes down to the threshold value in question due to the phase-refining procedure.

In a step S602, the controlling unit 280 tracks photocurrent variations at the frequency $\Omega/2\pi$. More precisely, the controlling unit 280 tracks voltage electrical signal variations at the output of the transimpedance amplifier TIA 245. The controlling unit 280 preferably performs integration over a predefined quantity of datacom samples (e.g., few hundreds of samples, such as 256 or 512, depending on coding and interleaving robustness), which means that a few tracking samples (e.g., 8 or 16 samples, or few tens, or even 2 or 56 samples, depending on incurred noise) are acquired within the $2\pi/\Omega$ time period. Datacom samples have to be understood as samples issued from the modulated optical signal transmitted by the coherent optical transmitter and tracking samples have to be understood as samples issued from the modulated optical signal generated by the phase modulator PM 301.

According to a particular embodiment relying on synchronous detection, the controlling unit 280 monitors evolution of the acquired tracking samples during the $2\pi/\Omega$ time period in view of the shape of the controlled error signal during said $2\pi/\Omega$ time period. In view of the definition of $\Omega$, propagation times of signals in the coherent optical receiver 200 are negligible and it is considered that variations of the controlled error signal and implied variations at the output of the transimpedance amplifier TIA 245 occur with a same time reference. Thus, the controlling unit 280 analyses the output of the transimpedance amplifier TIA 245 in parallel to the shape of the $\cos(\Omega t+\varphi)$ contribution in the optical signal output by the set formed by the local oscillator LO 210 and the polarization diversity actuator PDA 211.

According to the starting position of the phase modulation introduced by the phase modulator PM 301 and its amplitude, the photocurrent output by the DC filter 240, and consequently the analog electrical signal from the transimpedance amplifier TIA 245, synchronously increase or decrease, or pass a maximum value (vertex), with respect to shape of the controlled error signal amplitude. In other words, the controlling unit 280 analyses whether, in view that the controlled error signal amplitude varies as a cosine wave between $\varphi_0-\Delta\varphi_0$ and $\varphi_0+\Delta\varphi_0$, the analog electrical signal from the transimpedance amplifier TIA 245 synchronously increases or decreases, or passes the maximum value (vertex).

In a step S603, the controlling unit 280 checks whether the analog electrical signal from the transimpedance amplifier TIA 245 passes the maximum value (vertex). If such is the case, a step S605 is performed; otherwise, a step S604 is performed.

In the step S604, the controlling unit 280 modifies at least the modulation parameter $\phi_0$ in order to start the modulation closer to the aforementioned maximum value and attempt finding the value $\phi_{max}$ which provides said aforementioned maximum value. The controlling unit 280 increases or decreases the modulation parameter $\phi_0$ by a predetermined step value, for example $\Delta\phi_0$, so as to move the modulated signal toward the aforementioned maximum value (vertex). Typically, in synchronous detection, if the analog electrical signal from the transimpedance amplifier TIA 245 decreases while at the same time the shape of the cosine wave of the controlled error signal amplitude increases, or vice versa, the modulation parameter $\phi_0$ has to be decreased; and if the analog electrical signal from the transimpedance amplifier TIA 245 increases (or decreases) at the same time as the shape of the cosine wave of the controlled error signal amplitude, the modulation parameter $\phi_0$ has to be increased. Then the step S603 is repeated for further monitoring variations at the frequency $\Omega/2\pi$.

In the step S605, the controlling unit 280 fixes the modulation parameter $\phi_0$ to $\phi_{max}$. Phase is thus adjusted so that signal strength at the output of the transimpedance amplifier TIA 245 is optimized. The phase-refining procedure then ends, and the modulation parameter $\phi_0$ remains unchanged, and $\Delta\phi_0$ is set to 0, until the phase-refining procedure is launched again. When the phase-refining procedure is reinitiated, the controlling unit 280 preferably keeps the modulation parameter $\phi_0$ to $\phi_{max}$ as a starting point of the new phase-refining procedure.

Once $\phi_{max}$ is obtained and the polarization diversity actuator PDA 211 is configured in accordance, any fluctuation of the maximum of the photocurrent output by the DC filter 240, and consequently of the analog electrical signal from the transimpedance amplifier TIA 245, comes from a change in the axes of the state of polarization of the optical signals. So, with this phase-refining procedure, any phase detuning is mitigated, independently of its nature (whether: wavelength detuning, polarization change or phase shift), and if several phase detuning phenomena simultaneously occur, they are jointly mitigated. Optimum signal strength is thus obtained at the output of the transimpedance amplifier TIA 245 in view of the orientations of the axes of the state of polarization of the optical signals.

In a particular embodiment of the step S605, the controlling unit 280 modifies the ellipticity phase shift $\psi_l$ in order to compensate for $\phi_{max}$ and resets the modulation parameter $\phi_0$ (fixing $\phi_0$ to 0). Indeed, ellipticity phase detuning $\Delta\psi$ between the optical signal output by the set formed by the local oscillator LO 210 and the polarization diversity actuator PDA 211 and the optical signal received from the coherent optical transmitter acts similarly as wavelength detuning $\Delta\upsilon$ and phase detuning $\Delta\phi$ on both polarizations induced contributions at the output of the DC filter 240. Any one among said detuning phenomena can thus be compensated for, by adjustment of at least one of the others. In the arrangement of FIG. 3, mitigation of the static component of the phase detuning is thus transferred from the phase modulator PM 301 to the variable waveplate VW 302. It enables preserving dynamics of the phase modulator PM 301. In a more particular embodiment, transfer of the mitigation of the static component of the phase detuning is initiated by the controlling unit 280 in the case where the maximum value of the electrical voltage at the output of the transimpedance amplifier TIA 245 does not vary beyond a predetermined threshold THmax over a time period that corresponds to the bandwidth of the variable waveplate VW 302.

In a particular embodiment, the controlling unit 280 monitors evolution of the phase detuning so as to detect wavelength detuning and adjusts wavelength configuration of the local oscillator LO 210 in accordance. Processing resources and complexity needed to perform such monitoring are limited compared with processing resources tracking state of polarization. This aspect is presented hereafter with respect to FIG. 7.

Figure 7:
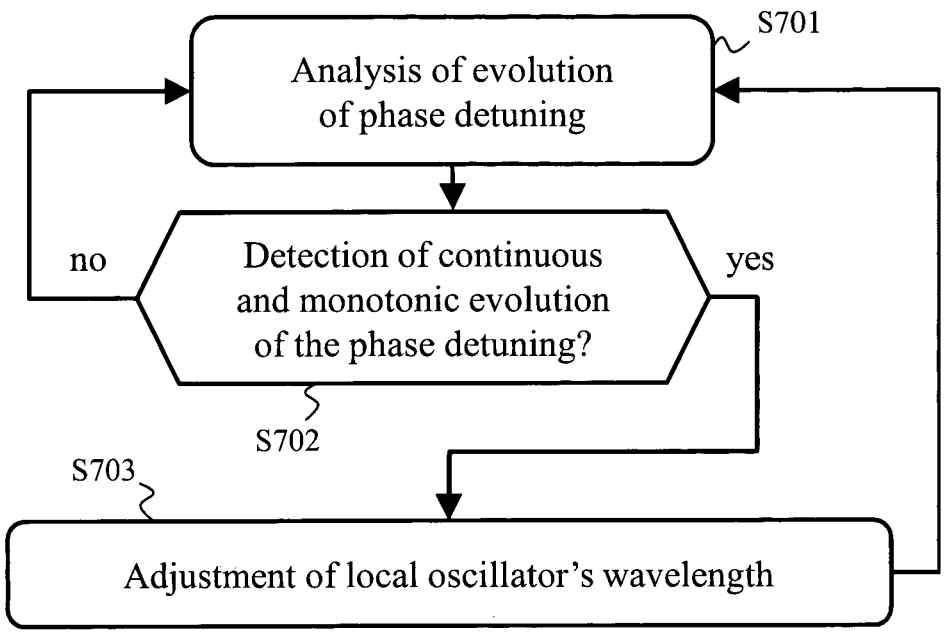
FIG. 7 schematically represents an algorithm performed by the controlling unit for adjusting wavelength of a local oscillator of the coherent optical receiver of FIG. 2.

FIG. 7 schematically represents an algorithm performed by the controlling unit 280 for adjusting wavelength of the local oscillator LO 210.

In a step S701, the controlling unit 280 monitors evolution of the phase detuning so as to detect wavelength detuning. Thus, in a step S702, the controlling unit 280 checks whether or not a continuous and monotonic evolution of phase detuning is present at the output of the transimpedance amplifier TIA 245. Indeed, wavelength drift of a laser is induced by adiabatic evolution of laser cavity. This can be caused by auto-modulation gain, thermal effects. . . . Adiabatic evolution often refers to phenomena with time constants of the order of few milliseconds to several seconds or even more. Phase noise and frequency or wavelength detuning are distinguished the one from the other as reference to the time scale, i.e., symbol duration. Hence, any instabilities longer than the symbol duration is viewed as a wavelength drift, while any instabilities with a time constant shorter or about symbol duration is viewed as a phase noise.

If the controlling unit 280 detects a continuous and monotonic evolution of phase detuning, a step S703 is performed; otherwise, the step S701 is repeated. A waiting period may be applied before repeating the step S701.

In the step S703, the controlling unit 280 adjusts wavelength of the local oscillator LO 210 so as to compensate for the continuous and monotonic evolution of phase detuning detected. Then the step S701 is repeated. A waiting period may be applied before repeating the step S701.

Once wavelength adjustment has been performed, the controlling unit 280 preferably reinitiates the phase-refining procedure. In a more particular embodiment, the controlling unit 280 preferably reinitiates the phase-refining procedure at time intervals (e.g., regular time intervals) during reconfiguration transitory period (slow reactivity) of the local oscillator LO 210. Thus, during the time needed by the local oscillator LO 210 to effectively adapt the wavelength, the controlling unit 280 compensates for transitory wavelength evolution with overmodulation of the controlled error signal.

In a particular embodiment, when the domain-switching procedure is initiated, and when a phase-refining procedure is on-the-way, the controlling unit 280 stops and resets the phase-refining procedure. The phase-refining procedure is reinitiated once the change of configuration of the polarization diversity actuator is achieved with respect to the ellipticity main axis orientation $\phi_l$ and/or the ellipticity phase shift $\psi_l$. The domain-switching procedure has thus higher priority than the phase-refining procedure, especially during initialization of the coherent optical receiver 200.

Figure 8:
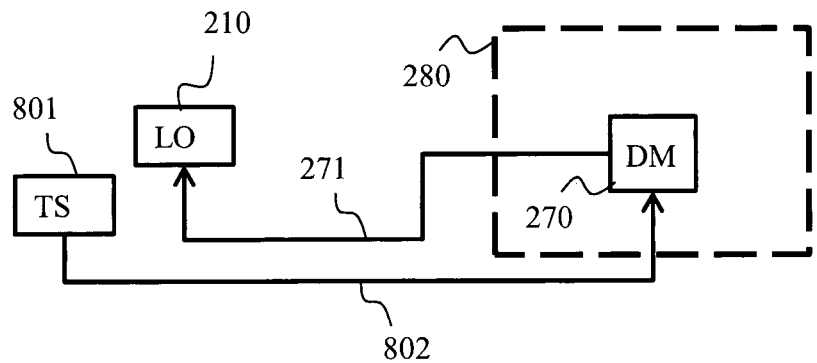
FIG. 8 schematically represents a temperature sensor-based particular arrangement of the coherent optical receiver.

FIG. 8 schematically represents a temperature sensor-based particular arrangement of the coherent optical receiver 200.

Indeed, the presence of a slow evolution of wavelength detuning is often due to an evolution of the temperature of laser chip. This happens when there is no Peltier system to regulate properly the temperature of the laser chip. Thus, in a particular embodiment, the local oscillator LO 210 is coupled with a temperature sensor TS 801 capturing temperature of the local oscillator LO 210, typically of the laser chip of the local oscillator LO 210. Temperature data are for instance provided to the detuning manager DM 270 via a link 802. Furthermore, the controlling unit 280 includes a look-up table that establishes a relationship between temperature drift and wavelength drift. The controlling unit 280 monitors evolution of the temperature captured by the temperature sensor. According to temperature drift shown by the evolution of the temperature captured by the temperature sensor TS 801, the controlling unit 280 retrieves corresponding wavelength drift from the look-up table and subtracts the effect of said wavelength drift to the other phase-impacting effects by superimposing to the controlled error signal a contribution that is the opposite of the phase evolution induced by the wavelength drift, namely $-2\pi\Delta\upsilon t$, over the $[0,2\pi]$ domain for instance (effect on the photocurrent is modulo $2\pi$). Doing so preserves dynamics of the phase modulator PM 301.

The invention claimed is:

1. A coherent optical receiver intended to receive an amplitude-shift keying modulated optical signal from a coherent optical transmitter, comprising:
   a local oscillator;
   a polarization-diversity actuator configured for modifying an optical signal output by the local oscillator; so as to form an optical signal with elliptical polarization with main axis orientation $\varphi_l$ and ellipticity phase shift $\psi_l$;
   a 2×2 coupler, having one input aiming at receiving the amplitude-shift keying modulated optical signal received from the coherent optical transmitter and the other input receiving another optical signal which is output by a set formed by a local oscillator and the polarization diversity actuator, so as to enable the local oscillator to provide a boosting effect to the amplitude-shift keying modulated optical signal received from the coherent optical transmitter, the 2×2 coupler further having one output connected to a set formed by a photodiode followed by a Direct Current filter removing a continuous component of an analog electrical signal output by the photodiode;
   a transimpedance amplifier converting current electrical signal output by the Direct Current filter into voltage electrical signal;
   a controlling unit in form of electronic circuitry configured for performing a domain-switching procedure instructing a configuration change of the polarization diversity actuator by modifying the ellipticity main axis orientation $\varphi_l$ and/or the ellipticity phase shift $\psi_l$ when the voltage electrical signal output by the transimpedance amplifier is below or equal to a predetermined first threshold THdsp corresponding to a predetermined percentage of theoretical maximum achievable by the boosting effect,
   and wherein the electronic circuitry is further configured for performing a phase-refining procedure inserting a controlled error signal in the phase of the optical signal output by the set formed by the local oscillator and the polarization diversity actuator, and adjusting a static component of the controlled error signal toward a maximum voltage electrical signal output by the transimpedance amplifier.

2. The coherent optical receiver according to claim 1, wherein, during domain-switching procedure, the modification of the ellipticity main axis orientation $\varphi_l$ is performed by applying a predefined shift equal to $\pi/4$ and the modification of the ellipticity phase shift $\psi_l$ is performed by applying a predefined shift equal to $\pi/2$.

3. The coherent optical receiver according to claim 1, wherein the polarization-diversity actuator comprises a variable waveplate for enabling modification of the ellipticity main axis orientation $\varphi_l$ and for enabling modification of the ellipticity phase shift $\psi_l$.

4. The coherent optical receiver according to claim 1, wherein the electronic circuitry is configured to implement an automatic configuration of a standby time period between successive executions of the domain-switching procedure, comprising:
   a monitoring of evolution of the electrical signal output by the transimpedance amplifier is first continuously performed in the scope of the domain-switching procedure;
   history of polarization state related variations is tracked by the monitoring and a time period between instructed successive changes in ellipticity parameter is monitored;
   once evolution of polarization state variations becomes stable, the stand-by time period between successive executions of the domain-switching procedure is defined so as to be lower than a stabilized time period between successive crossings of the predetermined first threshold THdsp.

5. The coherent optical receiver according to claim 1, wherein the electronic circuitry is configured to implement an automatic configuration of a standby time period between successive executions of the phase refining procedure, comprising:
   a monitoring of evolution of the electrical signal output by the transimpedance amplifier is first continuously performed in the scope of the phase-refining procedure;
   history of time periods between successive crossings of a predetermined second threshold THprp is monitored;
   the stand-by period between successive executions of the phase-refining procedure is defined so as to be lower than a stabilized time period between successive crossings of the predetermined second threshold THprp.

6. The coherent optical receiver according to claim 1, wherein the controlled error signal is a modulated signal.

7. The coherent optical receiver according to claim 6, wherein the controlled error signal is a modulation on the phase of the optical signal output by the set formed by the local oscillator and the polarization diversity actuator, which can be expressed under the following form:

$$\phi_0 + \Delta_0 \cos(\Omega t + \varphi)$$

wherein $\phi_0$ is said static component of the controlled error signal.

8. The coherent optical receiver according to claim 7, wherein during the phase-refining procedure, the electronic circuitry is configured for monitoring transimpedance amplifier output variations at a frequency defined by $\Omega$ and for adjusting $\phi_0$ toward reaching the maximum voltage electrical signal output by the transimpedance amplifier where $\phi_0$ equals to $\phi_{max}$.

9. The coherent optical receiver according to claim 7, wherein the electronic circuitry is configured for transferring mitigation of the static component $\phi_0$ by modifying the ellipticity phase shift $\psi_l$ so as to compensate for $\phi_{max}$ and further by resetting $\phi_0$.

10. The coherent optical receiver according to claim 9, wherein the electronic circuitry is configured for transferring mitigation of the static component $\phi_0$ in the case where the maximum voltage electrical signal at the output of the transimpedance amplifier does not vary beyond a predetermined third threshold THmax over a time period that corresponds to bandwidth of variable waveplate that is used in the polarization-diversity actuator for enabling modification of the ellipticity main axis orientation $\psi_l$ and for enabling modification of the ellipticity phase shift $\psi_l$.

11. The coherent optical receiver according to claim 1, wherein the electronic circuitry is configured for monitoring evolution of phase detuning so as to detect a continuous and monotonic evolution of phase detuning and adjusts wavelength configuration of the local oscillator so as to compensate for the continuous and monotonic evolution of phase detuning detected.

12. The coherent optical receiver according to claim 11, wherein once wavelength adjustment has been performed, the electronic circuitry is configured for reinitiating the phase-refining procedure.

13. The coherent optical receiver according to claim 12, wherein the electronic circuitry is configured for reinitiating the phase-refining procedure at time intervals during reconfiguration transitory period of the local oscillator.

14. The coherent optical receiver according to claim 1, further comprising a temperature sensor capturing temperature of the local oscillator and a look-up table that establishes a relationship between temperature drift and wavelength drift., and wherein the electronic circuitry is configured for monitoring evolution of temperature captured by the temperature sensor, for retrieving from the look-up table wavelength drift corresponding to temperature drift shown by the evolution of temperature and superimposing to the controlled error signal a contribution that is the opposite of phase evolution induced by the wavelength drift.

15. An Optical Network Unit intended to be used in a Passive Optical Network, wherein the Optical Network Unit includes the coherent optical receiver according to claim 1 for receiving an amplitude-shift keying modulated optical signal transmitted by a coherent optical transmitter included in an Optical Line Terminal of the Passive Optical Network.

* * * * *